United States Patent [19]

Froehlich

[11] 4,245,906
[45] Jan. 20, 1981

[54] SYSTEM AND METHOD FOR COMBINING FILM IMAGES

[76] Inventor: Robert J. Froehlich, 210 S. Louis St., Mt.Prospect, Ill. 60056

[21] Appl. No.: 93,803

[22] Filed: Nov. 13, 1979

[51] Int. Cl.³ .................. G03B 27/52; G03B 27/70
[52] U.S. Cl. .................................... 355/43; 352/90; 354/109; 354/122
[58] Field of Search ............... 352/90; 354/105, 109, 354/122, 124; 355/40–43

[56] References Cited

U.S. PATENT DOCUMENTS

| 1,959,498 | 5/1934 | Planskoy | 355/43 X |
| 2,848,533 | 8/2958 | Burr | 352/90 X |
| 3,155,978 | 11/1964 | Seitz | 355/43 X |
| 3,322,487 | 5/1967 | Renner | 355/43 X |
| 3,815,980 | 6/1974 | Roth | 352/90 |
| 3,819,264 | 6/1974 | Voorhees | 355/43 |
| 4,185,913 | 1/1980 | Ammann | 355/43 |

Primary Examiner—Richard A. Wintercorn
Attorney, Agent, or Firm—Leo J. Aubel

[57] ABSTRACT

A system for optically combining two images that may be photographed with a camera as a single image. The system is specifically adapted to generate slides in which lettering or graphic designs may be superimposed over various background patterns.

2 Claims, 3 Drawing Figures

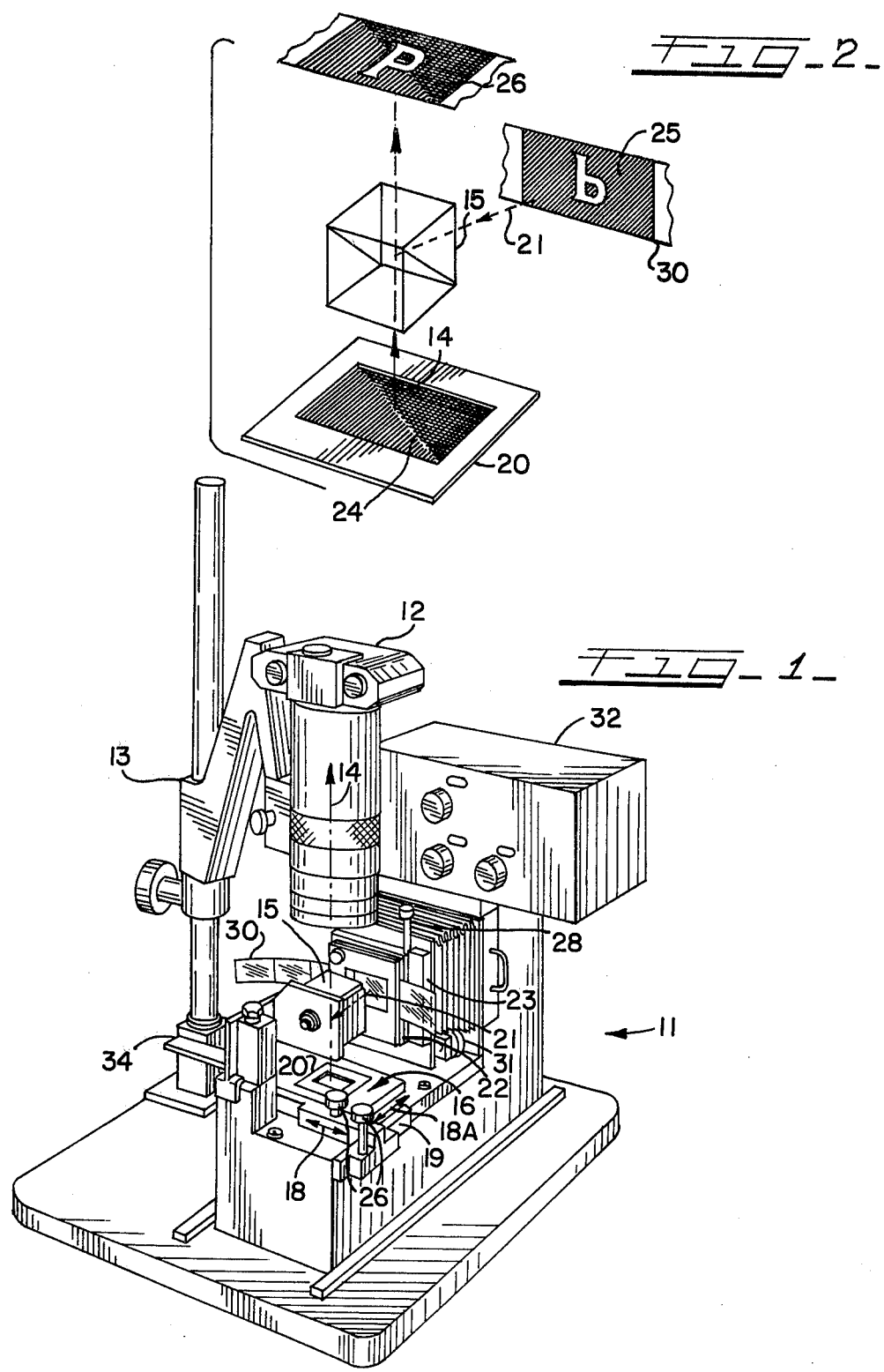

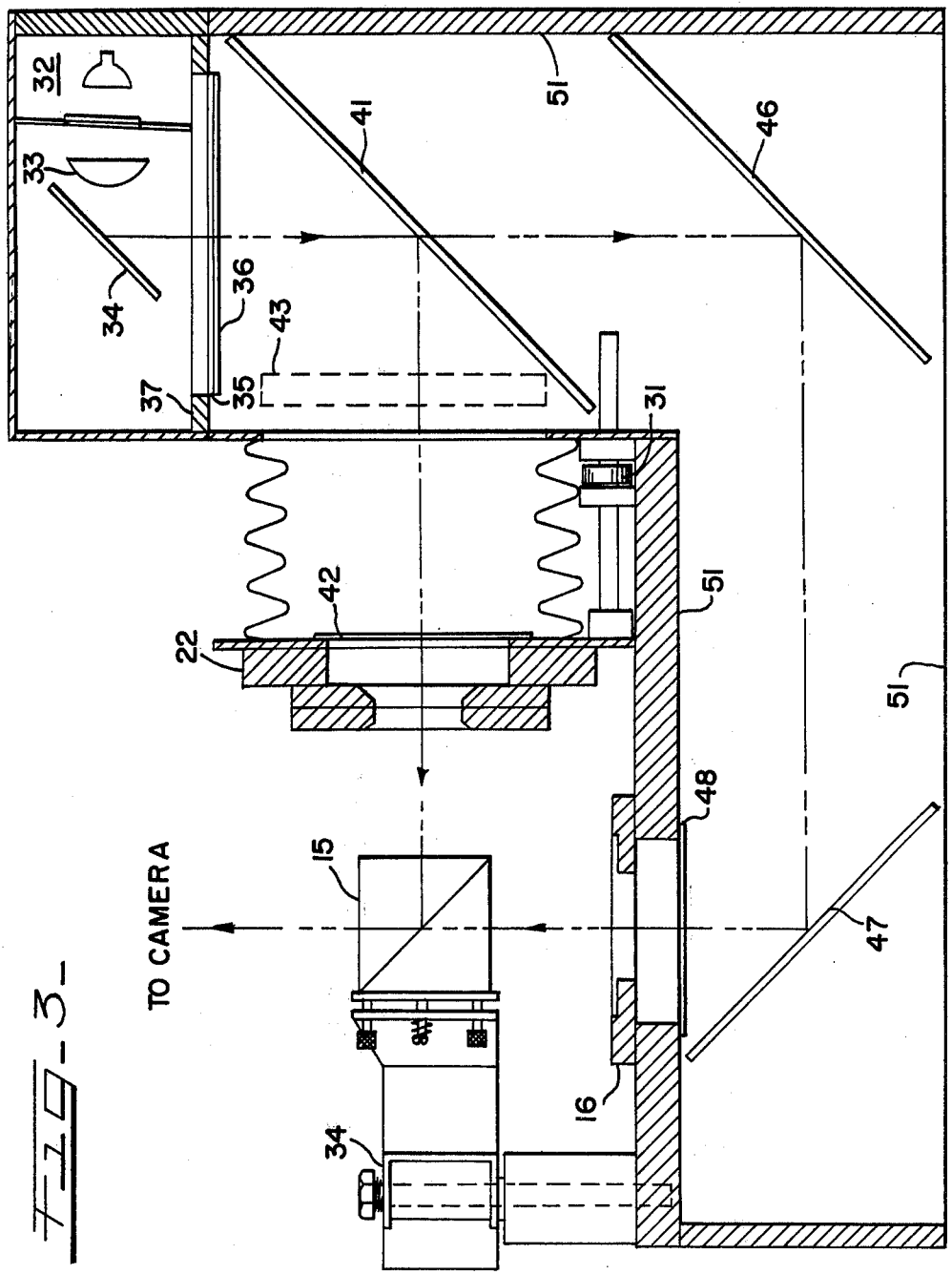

SYSTEM AND METHOD FOR COMBINING FILM IMAGES

BACKGROUND OF THE INVENTION

As recited in the abstract above, the present invention relates to a system for optically combining two images to provide a single image that may be photographed by a camera.

A number of prior art systems and methods are known for producing a composite photograph of two separate images. Such systems are shown in, for example, U.S. Pat. No. 3,815,980 to Roth, and U.S. Pat. No. 3,819,264 to Voorhees. In each of the foregoing structures, a title or heading information is superimposed on a filmed image. More particularly, U.S. Pat. No. 3,815,980 provides a movie camera projection system including a reflecting arrangement for causing the recording to the title or heading information on the film strip. U.S. Pat. No. 3,819,264 provides a cathode ray tube system which electronically displays programmed data onto a suitable reflector and the reflected data and a projected image are focused onto and recorded on a film.

Another known technique presently used for producing titles is the so-called "burn-through" technique, in which two exposures on the same frame are necessary to combine the images. A problem with this latter technique is that it requires absolute film and subject registration, and the cameras and copy stands for obtaining the desired registration are quite expensive.

SUMMARY OF THE INVENTION

The present invention provides an improved system and method for superimposing images which is particularly adaptable to superimposing lettering on a background image.

The inventive system may be used with a single lens reflex camera since only one exposure is required to add the images. Further, since only one exposure is necessary, the end product of the combination may be seen immediately, and provides a much simplified foreground and background alignment. It also allows the slide designer to consider aesthetic aspects of the finished product before going through the time and expense of processing film, and possibly re-shooting the images.

The foregoing features and advantages of the present invention will be apparent from the following more particular description of the invention. The accompanying drawings listed hereinbelow are useful in explaining the invention wherein:

BRIEF DESCRIPTION OF THE DRAWINGS

FIG. 1 is an isometric view of the inventive system;
FIG. 2 is a view indicating the means of combining of the filmed images; and
FIG. 3 is a view, partly in section, showing the internal structure of the inventive system.

DESCRIPTION OF THE INVENTION

Refer now to FIG. 1 which shows the inventive system 11. A single lens reflex camera 12 is adjustably mounted on a stand 13 to have a primary vertical optical axis 14 extending directly over a 40 mm square cube beamsplitter 15. The optical axis 14 intersects a film compound stage 16 which may be adjustably positioned in a horizontal plane 18 and 18A by a compound adjustment slide 19. The compound stage 16 is adapted to receive a transparent film slide 20. When the system 11 is properly aligned, the optical axis 14 of the lens passes through the geographic center of the beamsplitter 15 and of the film compound stage 16.

A second and horizontally extending optical axis 21 is generated by the beamsplitter 15 at a 90° angle to the primary vertical axis 14. The secondary horizontal axis 21 is aligned to intersect the geometric center of a film gate 22 mounted on a vertically adjustable slide 23. The film gate 22 is adapted to receive a length or short reel of transparent film 30. The images 24 and 25 formed on films 20 and 30, respectively, are visible along the primary and secondary optical axis 14 and 21, and add or are superimposed to provide the combined image 26 shown in the camera 12 viewfinder, see FIG. 2.

The beamsplitter 15 is in the form of a cube to avoid the problem of secondary reflections from the glass surfaces caused by flat plates. Optically coated flat plates which reduce secondary reflections are available, however, even in these coated plates a small but noticeable second image of the film gate can be seen. Due to the parallel surfaces and thin interface between prisms in the cube beamsplitter 15, the reflection problem is eliminated.

An alternate to the cube beamsplitter 15 would be a less expensive, but considerably more fragile, pellicle mounted at a 45° angle with respect to the primary optical axis.

The cube beamsplitter 15 is mounted on a pivoting bracket 34 which allows the cube 15 to be rotated in the horizontal plane away from the intersection point of the primary and secondary optical axis. The pivoting bracket 34 is spring loaded and shot-pin set when the cube is returned to its normal position. The foregoing structure facilitates the set up of the compound stage 16 and the film gate 22, and reduces the problems associated with the shifting of the secondary axis due to unavoidable mechanical tolerances in the bracket.

Refer now to FIG. 3 which shows the internal structure of the system 11. Illumination of both film images 24 and 25 is provided by a dichroic interference filter light source 32 (see FIG. 1) positioned above and to the rear of the film gate 22. An aspheric condenser lens 33 and a mirror 34 concentrate the unmixed filtered light on a frosted mylar diffuser 35 and an ultra violet filter 36 before illuminating the film images 24 and 25. Diffuser 35 and filter 36 are attached to the bottom of a suitable adapter block 37 which mounts the light source 32 to the body of the system.

As the light, indicated by the dot-dashed line, leaves the diffusion sheet 36, it is partially reflected to the film gate 22 by a flat plate beamsplitter 41 where it strikes a second mylar diffusion sheet 42 before reaching the film 22. Between the plate beamsplitter 41 and the film stage 22 is a filter drawer 43 which may be used to hold up three gelatin filter frames. The light which passes through the plate beamsplitter 41 is reflected by two 45 degree front surface mirrors 46 and 47 to illuminate another mylar diffusion sheet 48 located just below the compound primary film stage 16.

Specular reflecting surfaces 51 are used within the body of the system 11 to further mix the filtered light and reduce the light loss from the first diffusion sheet 35. The intensity of the light at both film stages 24 and 25 will be approximately equal, when no filters are placed in the filter drawer 43.

The system 11 is set up for operation by first focusing the image 24 on the compound stage 16 by adjusting the position of the camera 12 on the focusing stand 13. Next, the image 25 is focused by rotating a focusing knob 31 which moves the entire film gate 22 toward or away from the beamsplitter 15. The primary and secondary optical axis 14 and 25 should be the same length to properly focus both images 24 and 25.

In operation, the foreground image 25 which comprises the title or heading is loaded into the film gate 22 and the background film 24 placed on the compound stage 16. The background image 24 may be moved into position by the adjusting knobs 26 on the compound stage 16 and the title 25 shifted anywhere in the resultant frame by turning the vertical adjustment knob 28 and shifting the film in the film gate 22 horizontally. In this way, complete positioning freedom of the title is guaranteed.

In the embodiment shown, the background film remains fixed so the entire background image 24 is recorded as a full frame with the 1:1 macro camera lens. If a flat field lens and bellows are used in place of the fixed focus macro lens, variable enlargement ratios may be obtained. In this way, the background and title may be cropped as desired. Since the compound stage 16 is calibrated in 0.1 mm increments with vernier scales on the adjusting slides, precision double or triple panoramas may be made with appropriate edge masks.

Calibration of the system 11 is conveniently performed by providing identical films in both the film gate 22 and compound stage 16. Initially, both the gate 22 and stage 16 are positioned to some point close to the center of travel of their respective adjustments. The camera 12 and lens are located directly above the center of the film in the compound stage 16 in such a way as to fill the camera frame with the image on the stage 16. The camera 12 then remains stationary. The beamsplitter 15 is positioned in the optical axis 14 so the top surface of the cube 15 may be seen in the camera 12 viewfinder. Focus is readjusted on the film in the compound stage 16. Next, the vertical positioning adjustment 28 on the film gate 22 is turned until the gate 22 and stage 16 images are visible in the frame. A fine adjustment of the film gate 22 will then sharpen the focus on the film gate image. To complete the calibration, the beamsplitter 15 mount and film gate 22 vertical adjustment are tuned or finely adjusted until the two images 24 and 25 overlap.

Both the compound stage 16 and film gate 22 are constructed to provide user flexibility. In one embodiment, the compound stage 16 and film gate 22 are fitted with adapters for 2" square mounted slides and 35 mm unmounted film, respectively. Adapters can be made to sandwich multiple films or to sandwich film and mounted slides.

Varied effects may be created with different adapters. For example, to superimpose an object over a background, the image of the object either in a slide mounted or unmounted is sandwiched, or placed in a laminated arrangement, with a high contrast film which blocks out all the object itself, and the sandwich is placed in the film gate.

A second sandwich of the required background with a high contrast negative of the object mat (block out film used with the object) is placed on the compound stage. By adjusting the positioning elements of the stage and gate, the two images are brought into register and the effect of a solid background and a solid object without any bleed from one to the other is produced. The foregoing technique requires as many source films as do conventional methods; however, there is no pin registration requirement and the resultant effect is visible before the final exposure is made.

The system may also be used as a conventional slide copier by swinging the cube beamsplitter out of the optical path and focusing the camera on the slide to be duplicated on the compound stage. In this way, only one image is presented to the camera. For this application, conventional duplicating film may be used.

As an alternative to using duplicating film, any slide film may be used with the beamsplitter in place and no film in the film gate. Instead, a dark neutral density filter may be placed in the filter drawer to provide a contrast reducing fog which will be superimposed on the original slide. By selecting the value of neutral density filter to be used, the typical problem of increased contrast build-up with conventional slide films is eliminated. Further, if color compensating filters are used in addition to the neutral density filter, undesirable shadow color shifts, such as blue shadows under an otherwise acceptable sun-lit object, may be corrected. The system enables color correction to be made on improperly color balanced source slides as well as providing the necessary color compensation when duplicating original slides.

Improper color balance may be viewed and adjusted with the light source interference filters for middletones, and with individual color printing filters for the shadow details.

Just as in the slide copy exercise described above, color negative film may be used in the camera to create an internegative from an original slide with the same contrast and color correction controls.

While the invention has been particularly shown and described with reference to a preferred embodiment thereof, it will be understood by those skilled in the art, that various changes in form and details may be made therein without departing from the spirit and scope of the invention.

I claim:

1. An apparatus for producing a composite image from a transparent film having an image thereon and a photographic slide having a second image thereon, comprising in combination:
   (a) a light enclosing body;
   (b) a single source of light mounted in said enclosing body;
   (c) means for directing light from said source along a vertical axis;
   (d) a first beam splitter for directing a first portion of the light from said source along a horizontal axis, and for passing a second portion of said light along said vertical axis;
   (e) first mirror means for reflecting said second portion light along a second horizontal axis;
   (f) third mirror means for directing said second portion of light along a second vertical axis;
   (g) means for positioning a transparent film containing a first image along a first plane to receive said first portion of light;
   (h) means for positioning a photographic slide containing the second image in a second plane transverse to said first plane;
   (i) said third mirror means directing said second portion of light through said photographic slide;

(j) light beam splitting means for combining the images from said film and said slide, and directing the combined image along a selected axis; and, (k) camera means mounted to photograph said combined images along said selected axis for producing a composite image in desired registry.

2. An apparatus as in claim 1, wherein said means for receiving said photographic slide comprises a compound stage for providing a two-axis horizontal adjustment, wherein said means for positioning said film comprise a film gate and means for vertically adjusting said film gate; and said apparatus including focusing means for moving said film gate toward and away from said beam splitting means.

* * * * *